(12) United States Patent
Tsai et al.

(10) Patent No.: US 6,873,778 B2
(45) Date of Patent: Mar. 29, 2005

(54) FIBER CONTAINER AND ASSOCIATED OPTICAL COMMUNICATION DEVICE

(75) Inventors: Tsung-Yueh Tsai, T.E.P.E. (TW);
Chin-Hsiang Wang, T.E.P.E. (TW);
Yu-Ting Lee, T.E.P.E. (TW);
Chih-Hsien Lin, T.E.P.E. (TW)

(73) Assignee: Asia Optical Co., Inc., T.E.P.E. (TW)

( * ) Notice: Subject to any disclaimer, the term of this patent is extended or adjusted under 35 U.S.C. 154(b) by 213 days.

(21) Appl. No.: 10/291,836

(22) Filed: Nov. 12, 2002

(65) Prior Publication Data

US 2003/0190134 A1 Oct. 9, 2003

(30) Foreign Application Priority Data

Apr. 9, 2002 (TW) ........................................ 91107048 A

(51) Int. Cl.[7] .............................................. G02B 6/00
(52) U.S. Cl. ........................ 385/135; 385/136; 385/137
(58) Field of Search ................................ 385/134–135, 385/24, 137, 37; 359/341, 350, 337.1, 334; 398/9, 1

(56) References Cited

U.S. PATENT DOCUMENTS

| | | | | |
|---|---|---|---|---|
| 5,778,132 A | * | 7/1998 | Csipkes et al. | ............. 385/135 |
| 6,201,923 B1 | * | 3/2001 | Yuhara et al. | ............. 385/137 |
| 6,684,020 B2 | * | 1/2004 | Wojcik | ...................... 385/135 |
| 2002/0181923 A1 | * | 12/2002 | Wojcik | ...................... 385/135 |

* cited by examiner

*Primary Examiner*—Brian Healy
*Assistant Examiner*—Ryan Lepisto
(74) *Attorney, Agent, or Firm*—Bacon & Thomas, PLLC

(57) ABSTRACT

A fiber container receiving optical fibers has a body, a space defined in the body, a reel disposed inside the body, wherein a groove is defined around the periphery of the reel. The optical fibers are twisted around the reel and received in the groove. Furthermore, the fiber container is able to apply to the active/passive optical communication device, such as an erbium doped fiber amplifier (EDFA) or a dense wavelength division multiplexer (DWDM).

23 Claims, 10 Drawing Sheets

FIBER CONTAINER AND ASSOCIATED OPTICAL COMMUNICATION DEVICE

BACKGROUND OF THE INVENTION

1. Field of Invention

The present invention relates to a fiber container, and more particularly to a fiber container applied to an active/passive optical communication device.

2. Related Art

With reference to FIG. 1, a conventional container (70) for the DWDM (dense wavelength division multiplexer) is shown, wherein the DWDM is packaged inside the container (70) of a routing device. The container (70) includes a rectangular housing (71) and a cover (79). At the one side of the container (70), multiple through holes (72) are defined. With reference to FIG. 2, when the container (70) is applied to package a two-channel DWDM, a first DWDM unit (74) is securely placed at one corner inside the housing (71). Thereafter, a first optical fiber (741) connected to the first DWDM unit (74) is wound around the inner periphery of the housing (71) and further extends through one of the multiple though holes (72). A second optical fiber (742) connected to the first DWDM unit (74) is wound around the periphery of the housing (71) and is further connected to a second DWDM unit (75). After a third optical fiber (751) connected to the second DWDM unit is wound around the inner periphery of the housing (71), the third optical fiber (751) further extends through another hole (72). In FIG. 2, the second DWDM unit (75) and the first DWDM unit (74) are respectively and diagonally placed at two corners of the housing (71). After the cover (79) is provided to seal the housing (71), the DWDM packing process is finished.

However, one drawback of the conventional container is that each optical fiber and DWDM unit may interlace and overlap each other when these multiple optical fibers are encircled therein. Therefore, the DWDM packing process will become difficult when more DWDM units are placed inside the housing.

Another drawback of the conventional container is that the curvature of each optical fiber packed inside is hard to control. The more the curvature of the optical fiber is increased, the more signal transmission loss is generated.

To overcome the shortcomings, a fiber container in accordance with the present invention obviates or mitigates the aforementioned problems.

SUMMARY OF THE INVENTION

The primary objective of the present invention is to provide a fiber container that is suitable to apply to an active/passive optical communication device.

To achieve the objective, the fiber container comprises a body having a space defined therein, a reel placed inside the space, wherein a groove is defined around the periphery of the reel to receive the optical fibers winded around the reel.

One characteristic of the present invention is that the reel has a groove, whereby the optical fibers are able to be tidily retained in the groove.

Another characteristic of the present invention is that the reel is formed to a substantially circular shape, and the diameter of the reel is approximately two inches/50 mm.

One advantage of the present invention is that the curvature of each optical fiber is precisely controlled because the optical fibers are tidily retained inside the routing box.

Another advantage of the present invention is that the fiber container is able to be applied to an optical communication device, such as a DWDM or an erbium doped fiber amplifier (EDFA).

Other objects, advantages and novel features of the invention will become more apparent from the following detailed description when taken in conjunction with the accompanying drawings.

DETAILED DESCRIPTION OF THE INVENTION

Figure 1:
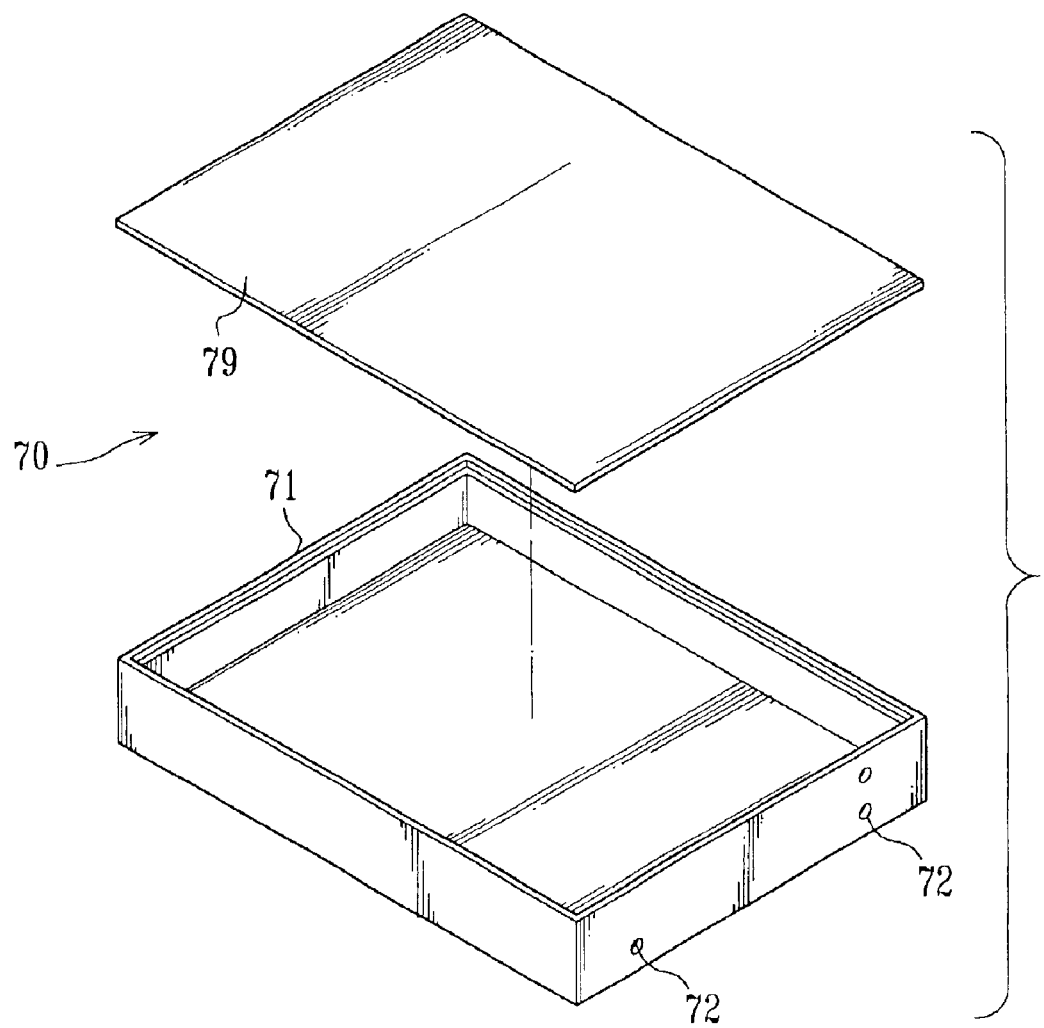
FIG. 1 is an exploded perspective view of a conventional fiber container for the DWDM.
Figure 2:
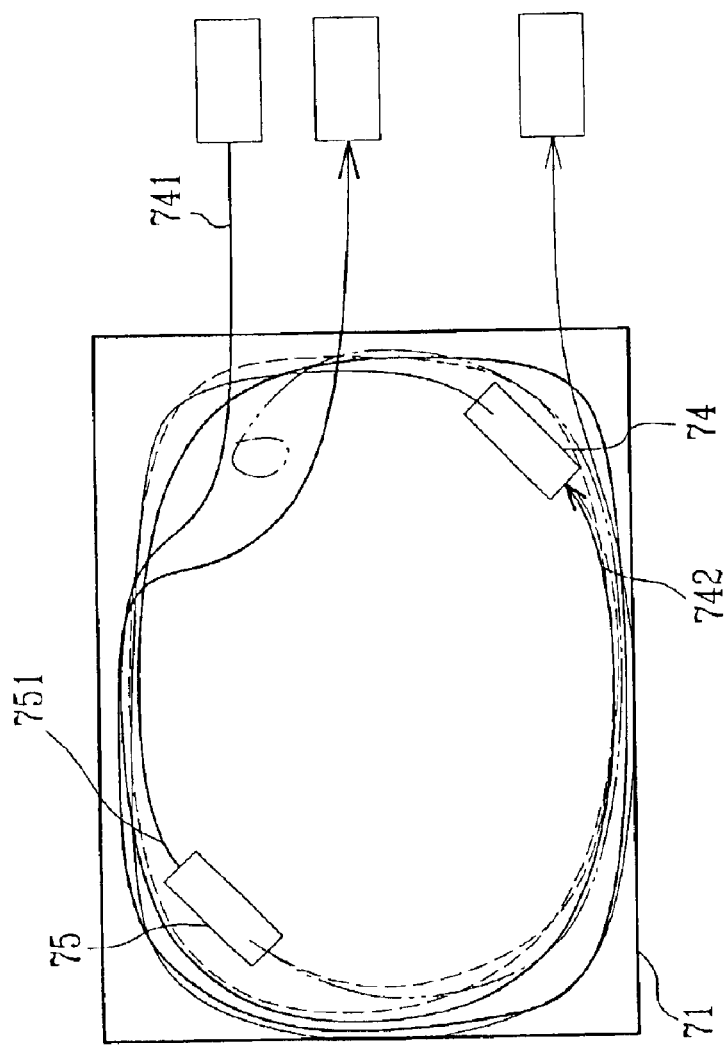
FIG. 2 illustrates the DWDM units packed inside the conventional fiber container of FIG. 1.
Figure 3A:
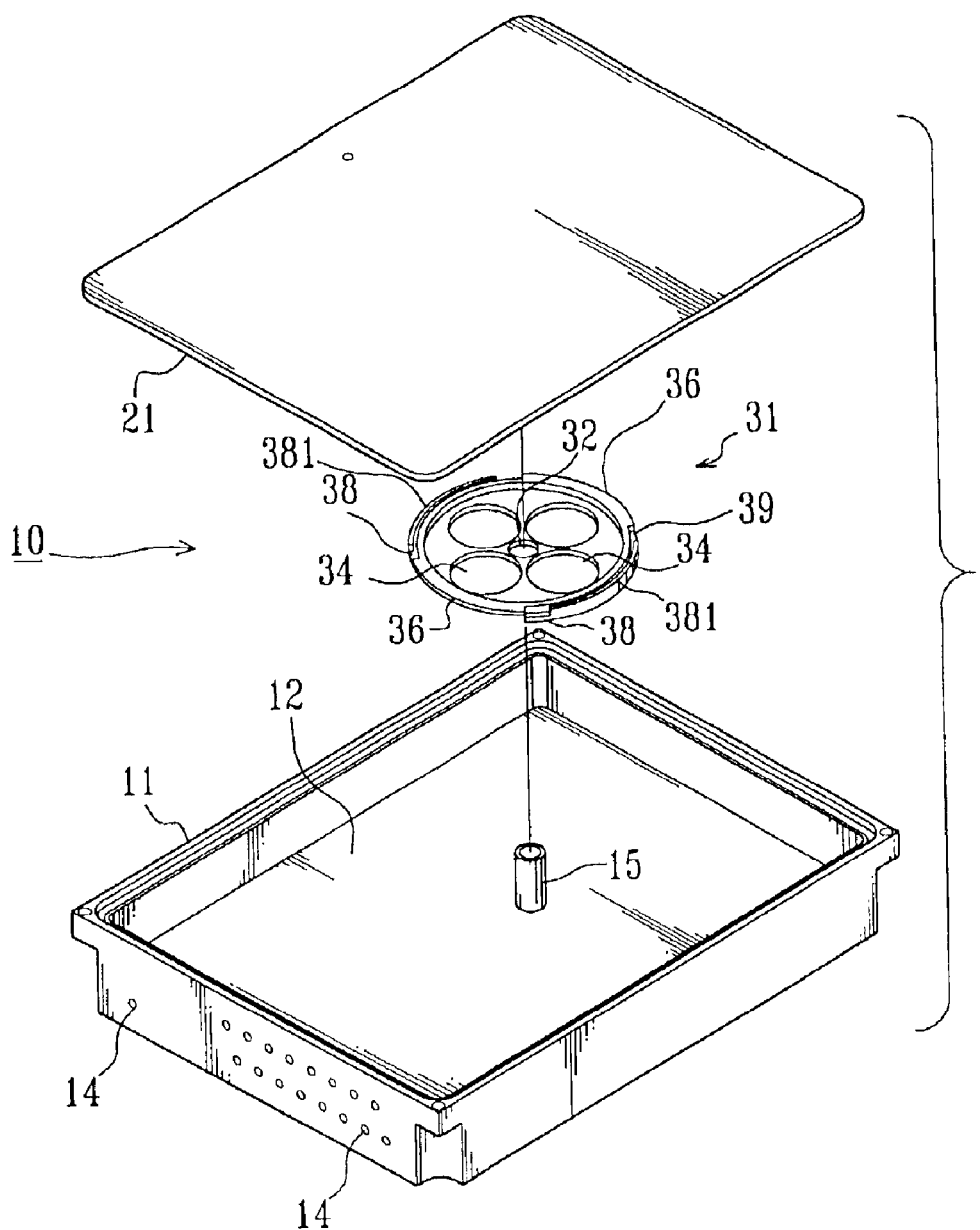
FIGS. 3A and 3B are exploded perspective views respectively showing two embodiments of a fiber container in accordance with the present invention.
Figure 3B:
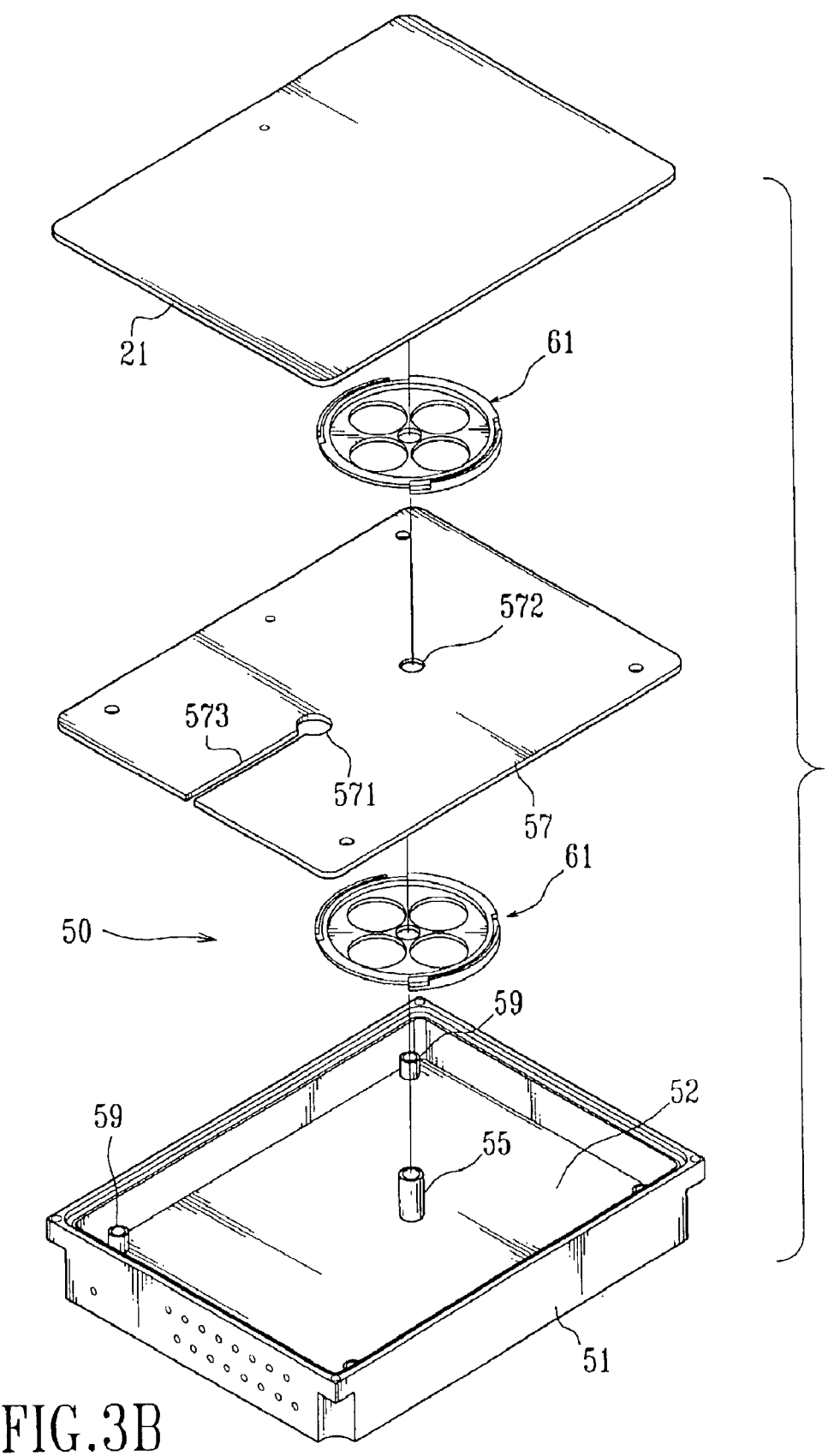

With reference to FIGS. 3A and 3B, a fiber container (10) of the present invention is shown. In FIG. 3A, the fiber container (10) is formed by a body (11), a cover (21), a positioning pin (15) and a reel (31). The body (11) is defined with a space (12) therein and a plurality of holes (14) at one side of the body (11). The positioning pin (15) is formed on the bottom of the body (11) and inside the space (12). The reel (31) is formed as a substantially circular shape and its diameter is approximately two inches. An axle hole (32) is defined at the center of the reel (31) to allow the positioning pin (15) to insert therethrough. Furthermore, at least one operating means (34), such as a hole, is defined in the reel (31) around the axle hole (32), whereby a user can turn the reel (31) to rotate relative to the positioning pin (15). A pair of first platform portions (36) integrally and oppositely extend from the upper rim of the reel (31). Further, a pair of second platform portions (38) integrally and oppositely extend from the lower rim of the reel (31), wherein the second paired platform portions (38) are crisscross arranged relative to the first paired platform portions (36) to define a groove (39) around the periphery of the reel (36). A blocking plate (381) is perpendicularly formed along the edge of each platform portion (38), whereby when the fibers are twisted in the groove (39), the block plate (381) prevents the fibers escaping from the groove (39).

In the present invention, a partition can be applied to divide the space (12) into several subspaces. With reference to FIG. 3B, the fiber container (50) further includes a partition (57) placed inside the space (52) to divide the space (52) into a first subspace (not numbered) and a second subspace (not numbered). Multiple supporting pillars (59) are disposed in the body (51) to support and position the partition (57). The partition (57) further has an intercommunicating portion, such as a hole (571) and a slit (573) communicating with the hole (571), to enable communications between the adjacent subspaces, and a hole (572) for enabling positioning pin (572) to pass between the subspaces.

In each subspace, a reel (61) is placed inside. As shown in FIG. 3B, each subspace has a reel (61) disposed therein, and each reel (61) is retained at a positioning pin (55). Therefore, the optical fibers twisted around first reel (61) are able to extend through the hole (571) into another subspace to twist around second reel (61).

Figure 4A:
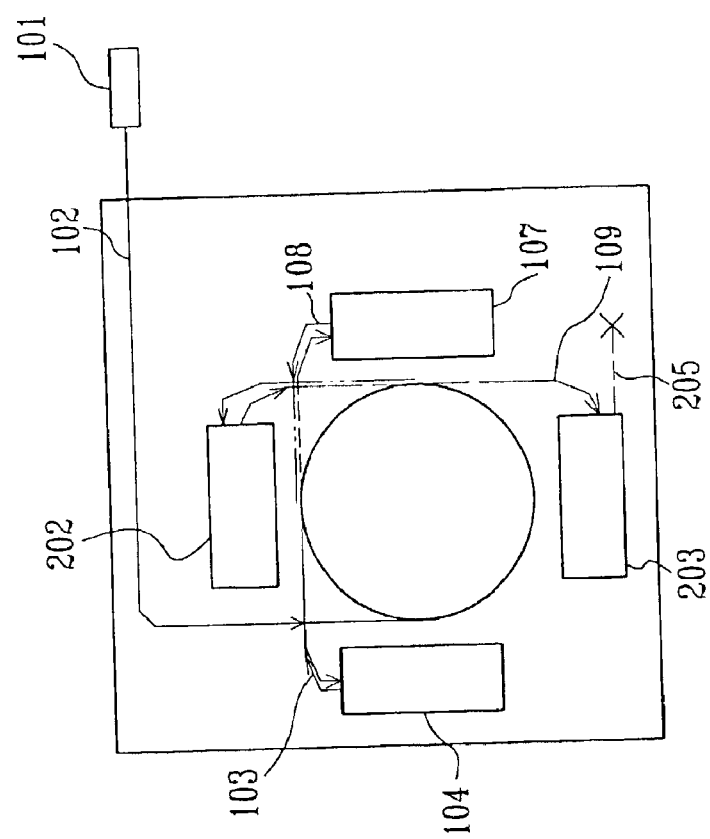
FIGS. 4A–4C briefly illustrate the fiber container in accordance with the present invention is applied to the DWDMs.
Figure 4B:
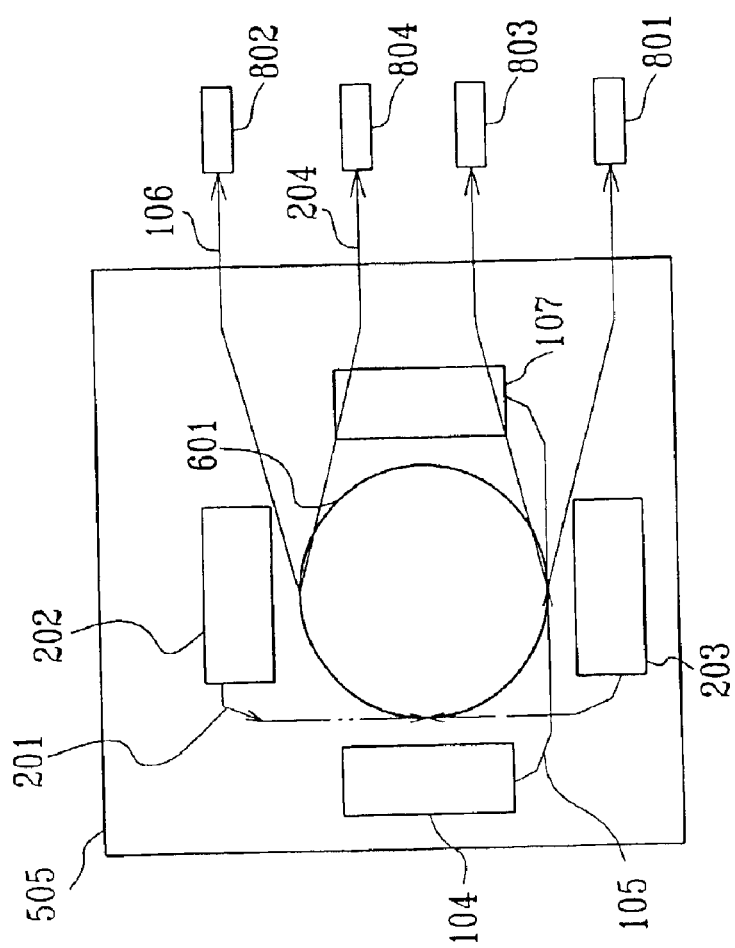
Figure 4C:
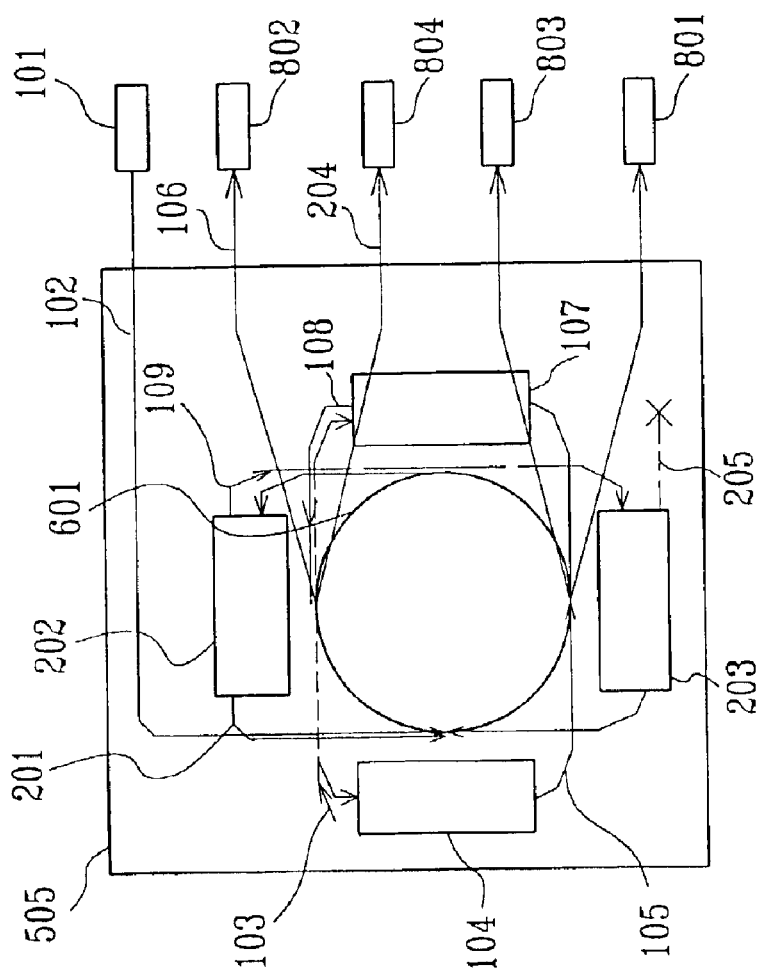

For example, with reference to FIGS. 4A–4C, the fiber container is applied to the dense wavelength division multiplexer (DWDM). As shown in FIG. 4A, a first optical fiber (102) from a signal source (101) is twisted around the reel (601) and further connected to a first DWDM unit (104). The reflected signal from the first DWDM unit (104) is further transmitted to a second DWDM unit (107) via a second optical fiber (103), wherein the second optical fiber (103) is twisted around the reel (601) and connected to the second DWDM unit (107). The reflected signal from the second DWDM unit (107) is further transmitted to a third DWDM unit (202) via a third optical fiber (108), wherein the third optical fiber (108) is twisted around the reel (601) and connected to the third DWDM unit (202). The reflected signal from the third DWDM unit (202) is further transmitted to a fourth DWDM unit (203) via a fourth optical fiber (109), wherein the fourth optical fiber (109) is twisted around the reel (601) and connected to the fourth DWDM unit (203).

With reference to FIG. 4B, the signal passing through the first DWDM unit (104) is transmitted to a first output terminal (801) via a fifth optical fiber (105), wherein the fifth optical fiber (105) is winded around the reel (601) and connected to the first output terminal (801). The signal passing through the second DWDM unit (107) is transmitted to a second output terminal (802) via a sixth optical fiber (106), wherein the sixth optical fiber (106) is winded around the reel (601) and connected to the second output terminal (802). The signal passing through the third DWDM unit (202) is transmitted to a third output terminal (803) via a seventh optical fiber (201), wherein the seventh optical fiber (201) is winded around the reel (601) and connected to the third output terminal (803). The signal passing through the fourth DWDM unit (203) is transmitted to a fourth output terminal (804) via an eighth optical fiber (204), wherein the eighth optical fiber (204) is winded around the reel (601) and connected to the fourth output terminal (804).

With reference to FIG. 4C, which is the combination of FIGS. 4A and 4B, each optical fiber connected with the DWDM unit is winded around the reel (601). Further, the reflected signal from the fourth DWDM unit (203) is transmitted to another DWDM unit (not shown) in another subspace via a ninth optical fiber (205), wherein the ninth optical fiber (205) is connected to another DWDM unit (not shown) in another subspace through the hole (571) defined in the partition (57).

Figure 5A:
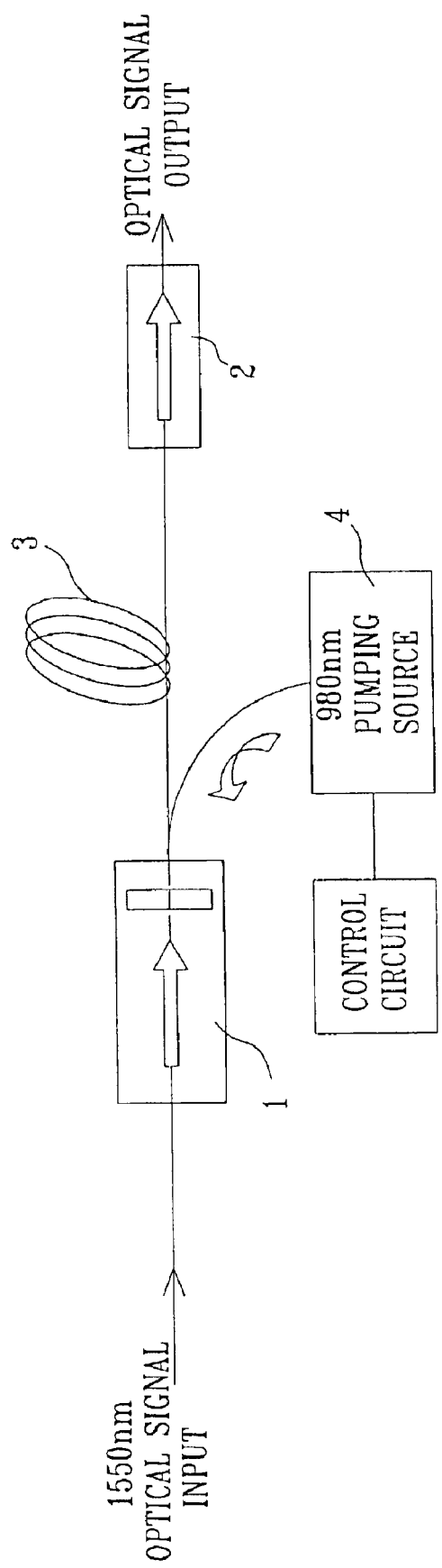
FIGS. 5A and 5B respectively show the signal transmission of an erbium doped fiber amplifier.
Figure 5B:
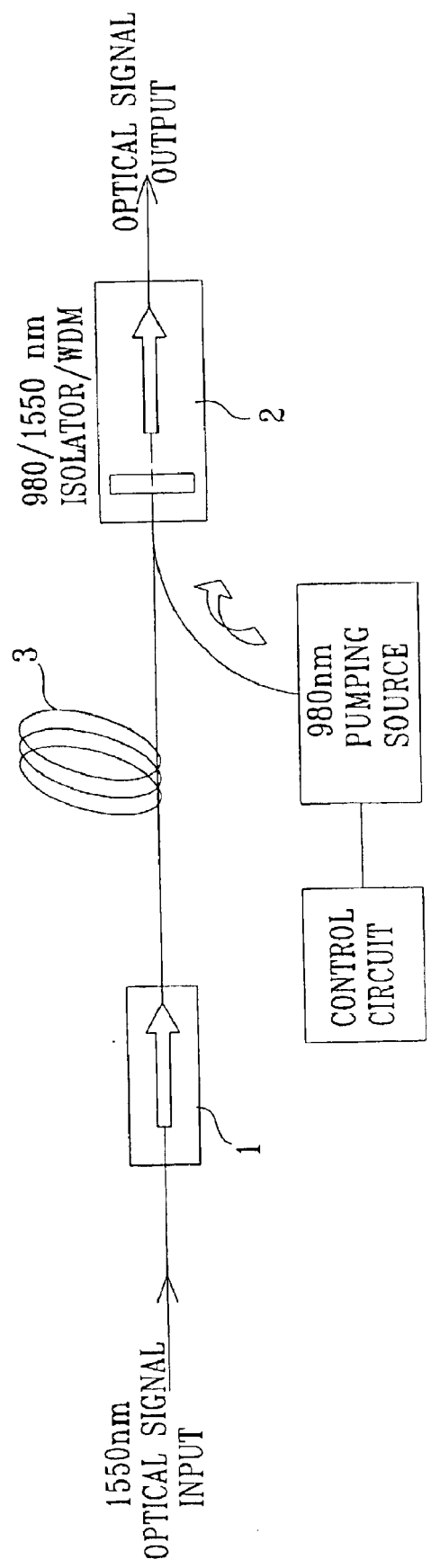

FIGS. 5A and 5B respectively shows the signal transmission of the erbium doped fiber amplifier. In FIG. 5A, a light beam with 980 nanometer (nm) wavelength together with an optical signal are input into an erbium doped fiber (3) through an optical isolator wavelength division multiplexer (1) (OIWDM). In the erbium doped fiber (3), the beam with wavelength 980 nm is applied to amplify the intensity of the optical signal, wherein the beam with wavelength 980 nm is intercepted by an optical isolator (2). In FIG. 5B, a beam with 980 nm wavelength is transmitted in the erbium doped fiber (3) through the OIWDM (2). In the erbium doped fiber (3), the beam applied to amplify the intensity of the optical signal has a transmitting direction being reverse to that of the optical signal. 14 The light beam is finally intercepted by an optical isolator (1).

Figure 6:
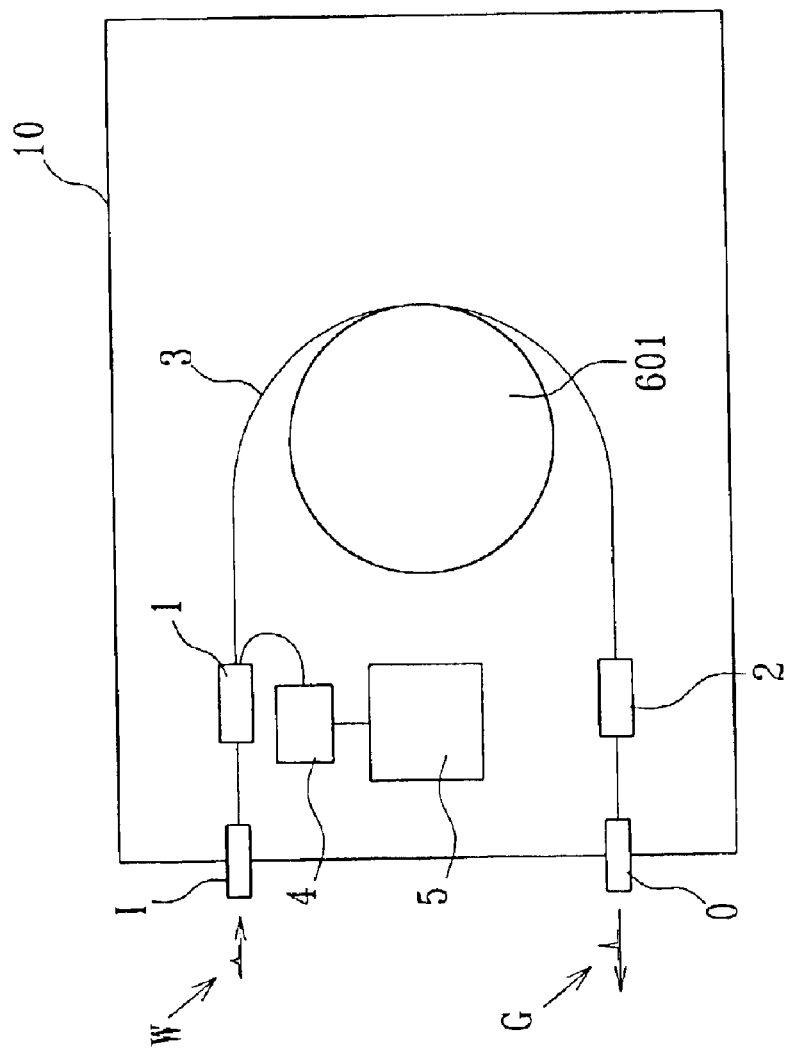
FIG. 6 shows the fiber container is applied to the erbium doped fiber amplifier.

FIG. 6 shows the fiber container (10) is applied to an erbium doped fiber amplifier, wherein the erbium doped fiber amplifier (EDFA) is received inside the fiber container. A signal input terminal (I) and a signal output terminal (O) are disposed at one side of the body (10), wherein the optical signal (W) is input from the input terminal (I) and the gained optical signal (G) is output from the output terminal (O). The fiber container (10) further comprises an OIWDM (1), an optical isolator (2), an optical pumping source (4) and an erbium doped fiber (3). One end of the erbium doped fiber (3) is connected to the OIWDM (1), and the other end is connected to the optical isolator (2). The erbium doped fiber (3) is twisted in the groove (not shown) of the reel (601). The optical pumping source (4), such as a LASER, emits an exciting beam, such as a light beam with wavelength 980 nm or wavelength 1480 nm, to excite the erbium atoms in the erbium doped fiber (3) into the excited state. When the optical signal is transmitted in the erbium doped fiber (3) with the excited erbium atoms, the intensity of the optical signal is amplified.

With reference to FIG. 6, the optical pumping source (3) is controlled by a control circuit (5) to emit an exciting beam, such as the light beam with wavelength 980 nm. The optical signal (W) from the input terminal (I) is passed through the OIWDM (1) into the erbium doped fiber (3). The light beam with wavelength 980 nm is also input into the erbium doped fiber (3) through the OIWDM (1), wherein both the transmitting directions of the optical signal (W) and the light beam are the same. When the optical signal (W) is amplified to a predetermined intensity, the amplified optical signal (G) is passed through the optical isolator (2) and output from the output terminal (O).

Even though the length of the erbium doped fiber (3) is longer than 25 meters, the fiber (3) is still able to be orderly twisted around the reel (601) and received in the groove.

The invention may be varied in many ways by a skilled person in the art. Such variations are not to be regarded as a departure from the spirit and scope of the invention, and all such modifications are intended to be included within the scope of the following claims.

What is claimed is:

1. A fiber container comprising:
   a body defined with a space therein;
   a positioning pillar formed in the space of the body; and
   a reel defined with an axle hole, whereby the reel is rotatably mounted on the positioning pillar when the positioning pillar is inserted through the axle hole,
   wherein the reel further has first platforms integrally and radially extending from an upper rim of the reel, second platforms integrally and radially extending from a lower rim of the reel, and a blocking plate upwardly and perpendicularly formed along an edge of each second platform so as to define a groove between mutually opposing surfaces of the second platform and an outer periphery of the reel, and
   wherein in the fiber container, optical fibers are able to be twisted around the reel and received in the groove.

2. The fiber container as claimed in claim 1, wherein an operating hole is further defined at the reel, therefore, by turning the operating hole, the reel is rotated relative to the positioning pillar.

3. The fiber container as claimed in claim 1, wherein a partition is further placed inside the body to divide the space into multiple subspaces.

4. The fiber container as claimed in claim 3, wherein a communicating portion is defined in the partition to enable communication between adjacent subspaces.

5. The fiber container as claimed in claim 3, wherein a plurality of supporting pillars is formed inside the body to support the partition.

6. A fiber container comprising:
a body defined with a space therein;
a partition disposed inside the body to divide the space into multiple subspaces;
a positioning pillar formed in the space of the body; and
multiple reels each being correspondingly placed in one of the multiple subspaces, wherein each reel is defined with an axle hole, whereby the reel is rotatably mounted on the positioning pillar when the positioning pillar is inserted through the axle hole,
wherein each reel further has first platforms integrally and radially extending from an upper rim of the reel, second platforms integrally and radially extending from a lower rim of the reel, and a blocking plate upwardly and perpendicularly formed along an edge of each second platform so as to define a groove between mutually opposing surfaces of the second platform and an outer periphery of the reel, and
wherein in the fiber container, fiber optic cables are able to be twisted around the reel and received in the groove.

7. The fiber container as claimed in claim 6, wherein an operating hole is further defined at each reel, therefore, by turning the operating hole, the reel is rotated relative to the positioning pillar.

8. The fiber container as claimed in claim 6, wherein a communicating portion is defined in the partition to enable communication between adjacent subspaces.

9. The fiber container as claimed in claim 6, wherein a plurality of supporting pillars is formed inside the body to support the partition.

10. A passive optical communication device comprising:
a body defined with a space therein;
a positioning pillar formed in the space of the body; and
a reel defined with an axle hole, whereby the reel is rotatably mounted on the positioning pillar when the positioning pillar is inserted through the axle hole; and
multiple dense wavelength division multiplexer (DWDM) units placed inside the body to form the passive optical communication device,
wherein each DWDM unit has an input optical fiber, a first output optical fiber and a second output optical fiber,
wherein the reel further has first platforms integrally and radially extending from an upper rim of the reel, second platforms integrally and radially extending from a lower rim of the reel, and a blocking plate upwardly and perpendicularly formed along an edge of each second platform so as to define a groove between mutually opposing surfaces of the second platform and an outer periphery of the reel, and
wherein in the passive optical communication device, the optical fibers are able to be twisted around the reel and received in the groove.

11. The passive optical communication device as claimed in claim 10, wherein an operating hole is further defined at the reel, therefore, by turning the operating hole, the reel is rotated relative to the positioning pillar.

12. The passive optical communication device as claimed in claim 10, wherein a partition is further placed inside the body to divide the space into multiple subspaces.

13. The passive optical communication device as claimed in claim 12, wherein a communicating portion is defined in the partition to enable communication between adjacent subspaces.

14. The passive optical communication device as claimed in claim 12, wherein a plurality of supporting pillars is formed inside the body to support the partition.

15. A passive optical communication device comprising:
a body defined with a space therein;
a partition disposed inside the body to divide the space into multiple subspaces;
a positioning pillar formed in the space of the body; and
multiple reels each being correspondingly placed in one of the multiple subspaces, wherein each reel is defined with an axle hole, whereby the reel is rotatably mounted on the positioning pillar when the positioning pillar is inserted through the axle hole; and
multiple dense wavelength division multiplexer (DWDM) units placed inside the body to form the passive optical communication device,
wherein each DWDM unit has an input optical fiber, a first output optical fiber and a second output optical fiber,
wherein each reel further has first platforms integrally and radially extending from an upper rim of the reel, second platforms integrally and radially extending from a lower rim of the reel, and a blocking plate upwardly and perpendicularly formed along an edge of each second platform so as to define a groove between mutually opposing surfaces of the second platform and an outer periphery of the reel, and
wherein in the passive optical communication device, the optical fibers are able to be twisted around the reel and received in the groove.

16. The passive optical communication device as claimed in claim 15, wherein an operating hole is further defined at each reel, therefore, by turning the operating hole, the reel is rotated relative to the positioning pillar.

17. The passive optical communication device as claimed in claim 15, wherein a communicating portion is defined in the partition to enable communication between adjacent subspaces.

18. The passive optical communication device as claimed in claim 15, wherein a plurality of supporting pillars is formed inside the body to support the partition.

19. A active optical communication device comprising:
a body defined with a space therein;
a positioning pillar formed in the space of the body; and
a reel defined with an axle hole, whereby the reel is rotatably mounted on the positioning pillar when the positioning pillar is inserted through the axle hole;
an optical pumping source arranged to emit an exciting beam;
a control circuit connected to the optical pumping source to control the optical pumping source to emit the exciting beam;
an input terminal disposed at one side of the body to receive an optical signal;
an erbium doped fiber twisted around the reel and retained in the groove;
an output terminal disposed at one side of the body, wherein the amplified optical signal in the erbium doped fiber is output from the output terminal;
an optical isolator wavelength division multiplexer connected between the input terminal and a first end of the erbium doped fiber, to guide the optical signal and the exciting beam to transmit in the erbium doped fiber, wherein the optical signal is amplified by the exciting beam in the erbium doped fiber; and an optical isolator connected between the output terminal and a second end of the erbium doped fiber, to guide the amplified optical signal to the output terminal and to intercept the exciting beam, wherein the reel further has first platforms integrally and radially extending from an upper rim of the reel, second platforms integrally and radially extending from a lower rim of the reel, and a blocking plate upwardly and perpendicularly formed along an edge of each second platform so as to define a groove between mutually opposing surfaces of the second platform and an outer periphery of the reel.

20. The active optical communication device as claimed in claim 19, wherein an operating hole is further defined at the reel, therefore, by turning the operating hole, the reel is rotated relative to the positioning pillar.

21. The active optical communication device as claimed in claim 19, wherein a partition is further placed inside the body to divide the space into multiple subspaces.

22. The active optical communication device as claimed in claim 21, wherein a communicating portion is defined in the partition to enable communication between adjacent subspaces.

23. The active optical communication device as claimed in claim 21, wherein a plurality of supporting pillars is formed inside the body to support the partition.

* * * * *